United States Patent [19]

Baek et al.

[11] Patent Number: 5,321,426

[45] Date of Patent: * Jun. 14, 1994

[54] SCAN LASER THERMAL PRINTER

[75] Inventors: Seung H. Baek, Pittsford; Charles D. DeBoer, Rochester, both of N.Y.

[73] Assignee: Eastman Kodak Company, Rochester, N.Y.

[*] Notice: The portion of the term of this patent subsequent to Dec. 1, 2009 has been disclaimed.

[21] Appl. No.: 891,890

[22] Filed: Jun. 1, 1992

Related U.S. Application Data

[62] Division of Ser. No. 451,656, Dec. 18, 1989, Pat. No. 5,168,288.

[51] Int. Cl.$^5$ .............................. B41J 2/45; B41J 2/46
[52] U.S. Cl. ..................... 346/76 L; 346/108
[58] Field of Search ................ 346/76 L, 140 R, 108, 346/160; 358/296, 298, 300, 302

[56] References Cited

U.S. PATENT DOCUMENTS

| | | | |
|---|---|---|---|
| 4,091,390 | 5/1978 | Smith et al. | 346/75 |
| 4,253,102 | 2/1981 | Kataoka et al. | 346/76 L |
| 4,698,691 | 10/1987 | Suzuki et al. | 358/283 |
| 4,723,830 | 2/1988 | Messbauer | 350/96.20 |
| 4,772,582 | 9/1988 | Deboer | 503/227 |
| 4,804,975 | 2/1989 | Yip | 346/76 L |
| 4,864,326 | 9/1989 | Kawamura et al. | 346/76 L |
| 4,961,079 | 10/1990 | Owens et al. | 346/108 |
| 5,168,288 | 12/1992 | Baek et al. | 346/76 L |

Primary Examiner—Benjamin R. Fuller
Assistant Examiner—N. Le
Attorney, Agent, or Firm—Robert L. Randall

[57] ABSTRACT

A thermal printer is disclosed which is adapted to form an image on a thermal print medium of a type in which a donor element transfers dye to a receiver element upon receipt of a sufficient amount of thermal energy. The printer includes a plurality of diode lasers which can be individually modulated to supply energy to selected dots on the medium in accordance with an information signal. In order to increase the efficiency and versatility of the printer, the print head of the printer includes a fiber optic array having a plurality of optical fibers coupled to the diode lasers. The thermal Print medium is supported on a rotatable drum, and the fiber optic array is movable relative to the drum.

17 Claims, 5 Drawing Sheets

SCAN LASER THERMAL PRINTER

CROSS REFERENCE TO RELATED APPLICATION

This is a divisional to U.S. patent application, Ser. No. 07/451,656, entitled "Scan Laser Thermal Printer" filed in the name of Seung H. Baek et al., on Dec. 18, 1989, now U.S. Pat. No. 5,168,288; this application is assigned to the assignee of the present invention.

BACKGROUND OF THE INVENTION

1. Field of the Invention

This invention relates to a thermal printer, and more particularly, to such a printer which uses lasers to provide thermal energy to the print medium.

2. Description of the Prior Art

In one type of thermal printer, a dye donor element is placed over a dye receiving element, and the superposed elements are supported for cooperation with a print head having a plurality of individual heating resistors. When a particular heating resistor is energized, it causes dye from the donor to transfer to the receiver. The density or darkness of the printed color dye is a function of the energy delivered from the heating element to the donor. One of the problems in printers of this type is that the thermal time constant of the resistors is quite long. As a result, the printing speed is relatively slow, and the image contrast is limited.

It is known to use lasers instead of the resistors to provide the thermal energy in thermal dye transfer printing. In U.S. Pat. No. 4,804,975, for example, there is shown thermal dye transfer apparatus which comprises an array of diode lasers which can be selectively actuated to direct radiation onto a dye carrying donor. Radiation from the diode lasers is modulated in accordance with an information signal to form an image on a thermal print medium. The diode laser array extends the full width of the print medium. One problem with this apparatus is that it is too expensive for many applications. The initial cost of such a large array is relatively high, and failure of only one diode laser in the array will result in discarding the entire array. A further problem with the patented apparatus is that it is difficult to vary the resolution of the reproduced image.

SUMMARY OF THE INVENTION

It is an object of the present invention to overcome the problems discussed above in the prior art and to provide an improved thermal printer.

In accordance with one aspect of the invention, there is provided a thermal printer for forming an image on a thermal print medium, the medium being of a type in which a dye is transferred by sublimation from a donor to a receiver as a result of heating dye in the donor, the printer comprising: a source of radiation; means for supporting a thermal print medium; means for directing radiation from the source in the form of a dot on the thermal print medium in order to provide sufficient thermal energy to the donor to cause dye to transfer to the receiver; means for moving the medium and the source relative to each other to form the image from a series of dots on the medium; and means for controlling the speed of the moving means in order to control the size of the dots.

In one embodiment of the present invention, a thermal printer includes a rotatable drum which supports a thermal print medium. A print head, supported adjacent the drum, is movable relative to the drum by means of a motor driven lead screw. The print head comprises a fiber optic array which is coupled to a plurality of diode lasers. Each of the diode lasers can be independently driven in accordance with an information signal. A lens supported on the print head is adapted to focus ends of optical fibers in the array on the print medium. The angle of the print head is adjustable in order to change the spacing between successive scan lines, and the speed of the drum can be changed to change the size of the dots, or pixels, produced on the medium.

A principal advantage of the thermal printer of the present invention is that a very precise control can be achieved in the line and pixel density of the reproduced image. The spacing between successive lines of the image is controlled by the angle of the print head. The size of dots produced by the printer can be controlled by the speed of the rotatable drum or by a change in the laser power. Continuous tone as well as half tone images can be printed with a wide range of pixel densities. A further advantage is that the printing elements can be made relatively compact, since they can be mounted separately from the diode lasers and electronic elements. The printing elements are connected to the diode lasers by means of a fiber optic bundle.

Other features and advantages will become apparent upon reference to the following description of the preferred embodiment when read in light of the attached drawings.

DESCRIPTION OF THE PREFERRED EMBODIMENT

Figure 1:
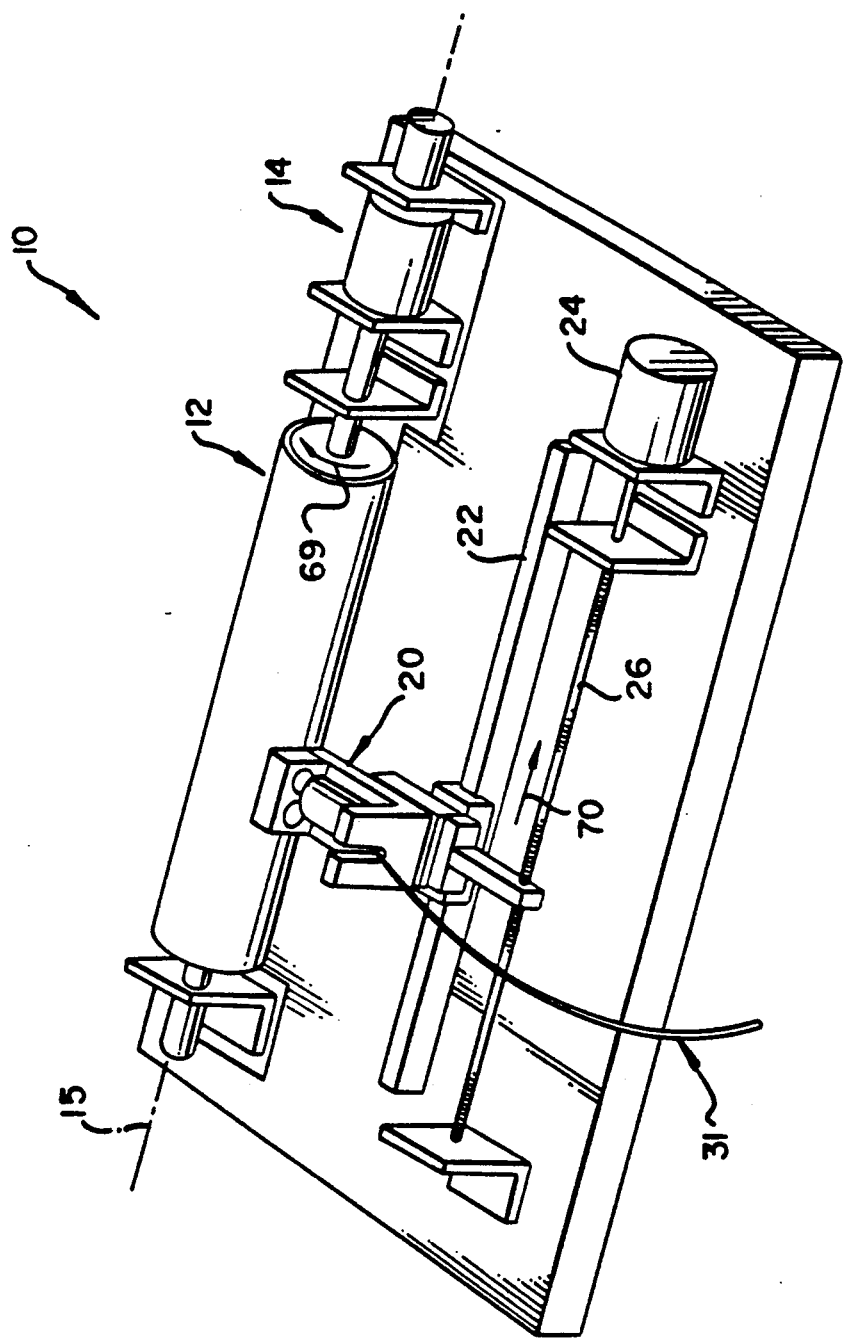
FIG. 1 is a perspective view of the thermal printer of the present invention.

With reference to FIG. 1, there is shown a thermal printer 10 constructed in accordance with the present invention. Printer 10 comprises a drum 12 which is mounted for rotation about an axis 15 and is driven by a motor 14. Drum 12 is adapted to support a thermal print medium, not shown, of a type in which a dye is transferred by sublimation from a donor to a receiver as a result of heating the dye in the donor. A thermal print medium for use with the printer 10 can be, for example, a medium disclosed in U.S. Pat. No. 4,772,582, entitled "Spacer Bead Layer for Dye-Donor Element Used in Laser Induced Thermal Dye Transfer," granted Sep. 20, 1988. This patent is assigned to the assignee of the present invention.

As disclosed in U.S. Pat. No. 4,772,582, the thermal print medium includes a donor sheet having a material which strongly absorbs at the wavelength of the laser.

When the donor is irradiated, this absorbing material converts light energy to thermal energy and transfers the heat to the dye in the immediate vicinity, thereby heating the dye to its vaporization temperature for transfer to the receiver. The absorbing material may be present in a layer beneath the dye or it may be admixed with the dye. The laser beam is modulated by electronic signals, which are representative of the shape and color of the original image, so that each de is heated to cause volatilization only in those areas in which its presence is required on the receiver to reconstruct the color of the original object.

Figure 2:
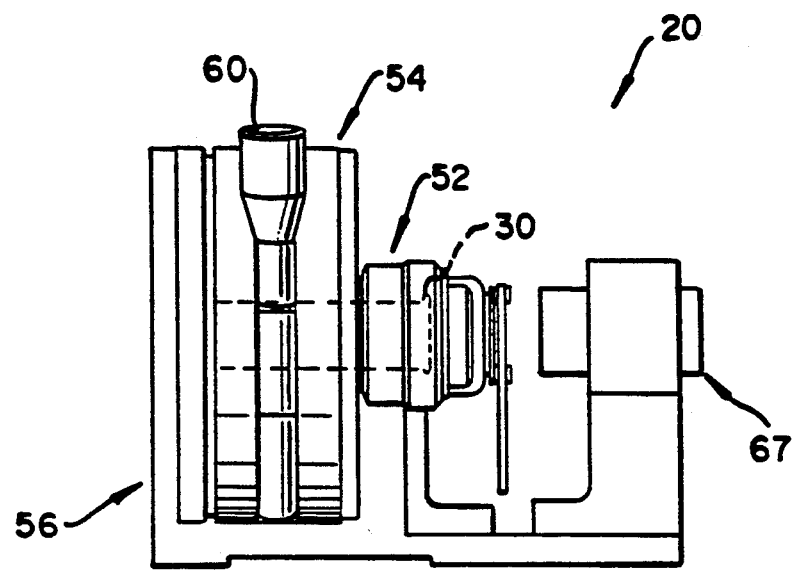
FIG. 2 is a side elevational view of the print head of the printer.
Figure 3:
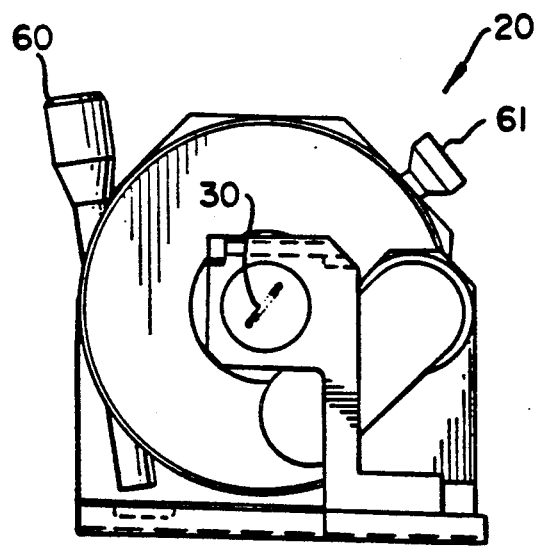
FIG. 3 is an end elevational view of the print head.
Figure 4:
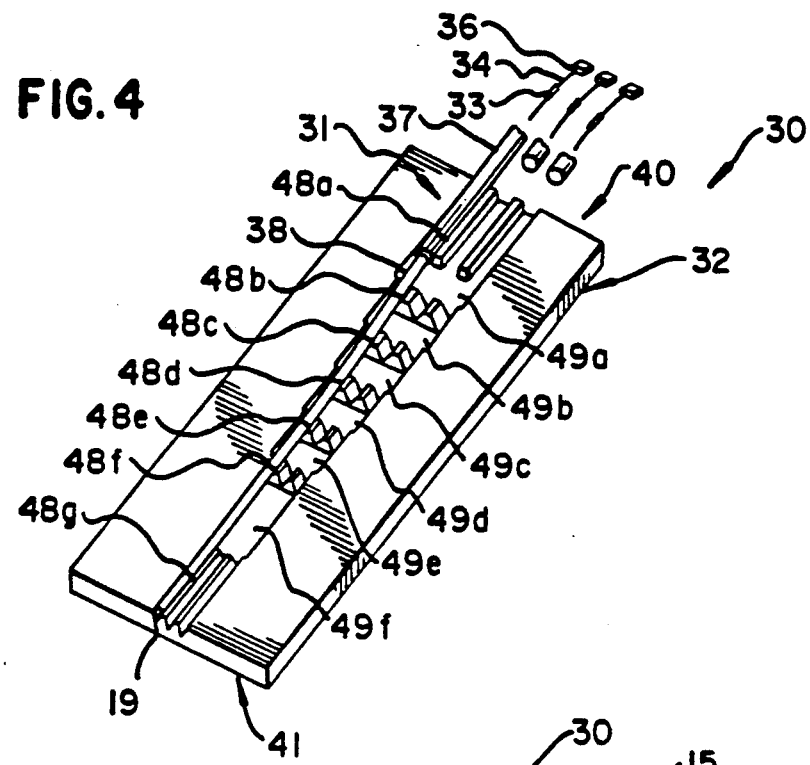
FIG. 4 is a perspective view of a fiber optic array suitable for use in the present invention.

A print head 20 is movably supported adjacent drum 12. Print head 20 is supported for slidable movement on a rail 22, and the print head 20 is driven by means of a mo&or 24 which rotates a lead screw 26. Print head 20 comprises a fiber optic array 30 (FIGS. 2–4). Optical fibers 31 in array 30 are connected to a plurality of diode lasers 36 which can be individually modulated to selectively direct light from the optical fibers onto the thermal print medium.

The array 30 can be of the type shown in FIG. 4. Array 30 comprises optical fibers 31 which are supported on a substrate 32. The full length of only one of the fibers 31 is shown in order &o more clearly illustrate various features of the invention; it will be understood, however, that each of the fibers 31 is identical and extends the full length of substrate 32. Each of the fibers 31 is connected by means of an optical fiber connector 33 to another optical fiber 34. Optical fiber connector 33 can be of the type shown in U.S. Pat. No. 4,723,830, entitled "Optical Fiber Connectors," issued Feb. 9, 1988. Each optical fiber 34 is connected to a light source 36, such as a diode laser. A suitable diode laser can be, for example, a No. SDL-2430 H2, manufactured by Spectra Diode Labs, Inc., Ca. Each light source 36 in array 30 can be modulated according to an information signal in a well known manner.

Figure 5:
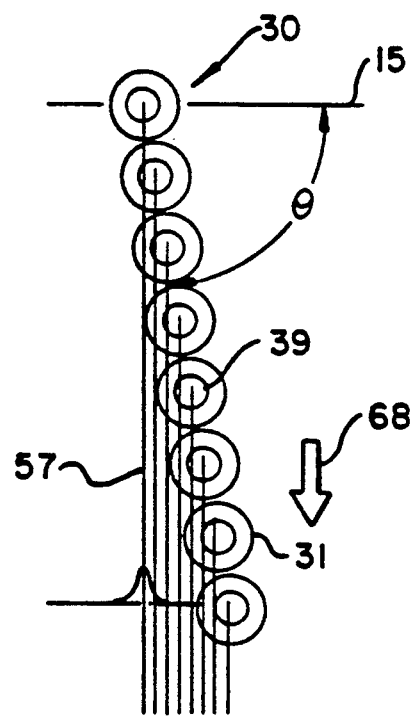
FIG. 5 is a diagram showing the spacing of successive lines of pixels for a particular angle of the print head.

Each of the optical fibers 31 includes a jacket 37, a cladding 38, and a core 39 (FIG. 5). Jacket 37 has been removed from a portion of the fiber to expose the cladding 38, and in a cladding end portion 19, the diameter of the cladding can be substantially reduced so that the end portions 19 can be more closely spaced relative to each other on substrate 32. A fiber suitable for use in the present invention is a multi mode fiber, Fiber No. 16-100S, manufactured by General Fiber Optics, Inc., N.J.

As shown in FIG. 4, fibers 31 extend from an input end 40 of array 30 which supports jackets 37 of the fibers to an output end 41 of the array, and the fibers 31 are closest together at end 41. Fibers 31 are mounted in sets of grooves 48a–48g which are formed in substrate 32 and are separated by planar areas 49a–49f in the substrate 32. Grooves 48a are generally rectangular in cross section and grooves 48b–48g are generally V-shaped in cross section. In a preferred embodiment, the areas 49a–49f are coplanar with the bottoms of adjacent grooves. Although only three fibers 31 are shown in the array 30 in FIG. 4, it will be understood that any number of fibers 31 can be supported on the substrate 32. In a preferred embodiment of the array 30 for printer 10, the array includes 14 fibers. A more complete description of a suitable array and the method of making such an array is disclosed in copending U.S. application Ser. No. 254,757, entitled "Method of Making a Fiber Optic Array," filed in the name of Kaueinen on Oct. 7, 1988.

As shown in FIGS. 2 and 3, array 30 is mounted in print head 20 for angular adjustment. Fiber optic array 30 is supported in a mounting ring 52 which is rotatably mounted in a collar 54. Collar 54 is fixed to a print head frame 56. An adjustment screw 60 is threadably mounted in collar 54 and bears against mounting ring 52 to provide for angular adjustment of the fiber optic array 30. A set screw 61 locks the array 30 in an adjusted position. A lens 67, supported on frame 56, is adapted to focus the ends of optical fibers 31 on the thermal print medium. It will be seen, with reference to FIG. 5, that the spacing between adjacent scan lines 57, formed by movement of the array 30 in the direction of arrow 68, can be adjusted by changing the angle $\theta$. The angle $\theta$ is the angle which the array 30 makes with the axis 15 of drum 12. It will be apparent that the printing line density can be regulated by changing the angle $\theta$.

In the use of printer 10, drum 12 would be driven in the direction of arrow 69 by motor 14. Each of the fibers 31 in print head 20 would be separately modulated in accordance with an information signal to produce a series of minipixels. During the printing process, print head 20 can be advanced continuously in the direction of arrow 70 so that helical scan lines (not shown) are traced on the thermal print medium supported on drum 12. Alternatively, during the time when no information is being written, print head 20 can be stepped the distance of one swath for each revolution of the drum 12 in order to trace truly vertical scan lines. Each pixel in the image is produced by 144 minipixels, and the diode laser 36 for each individual fiber is either on or off depending on the desired gray level. It will be seen that 144 different gray levels can be achieved in this manner. One method of controlling the minipixels to achieve different gray levels is disclosed in U.S. Pat. No. 4,698,691.

Figure 6:
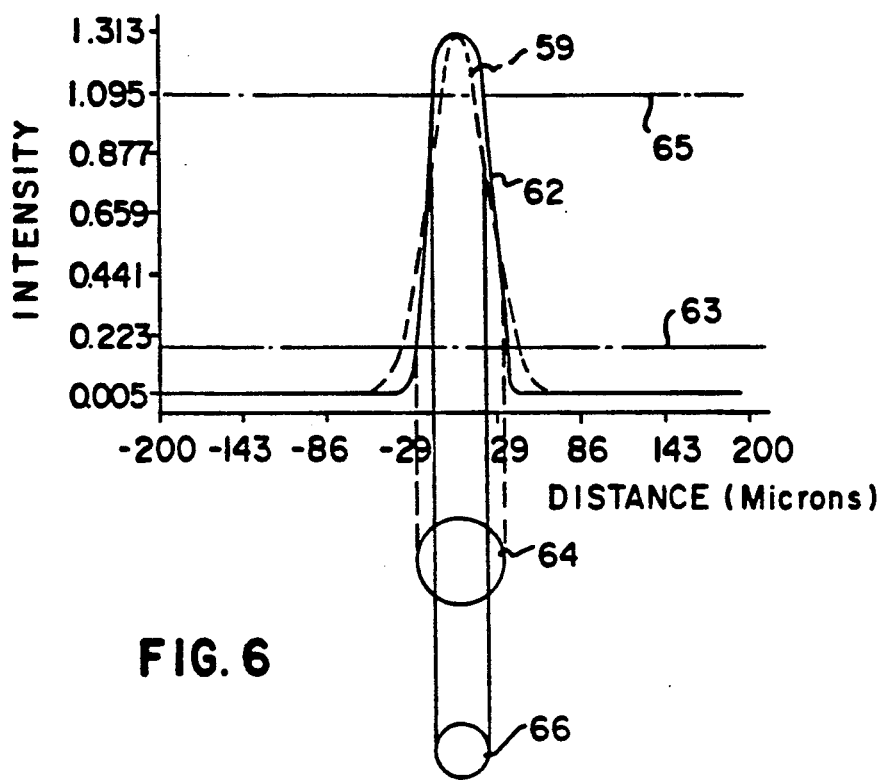
FIG. 6 is a diagram showing the focused beam profile and two different sizes of dots which are produced by two different speeds of the drum.

The dot size produced by printer 10 can be changed by adjusting thermal dye sublime threshold levels. With reference to FIG. 6, there is shown a focused beam profile 62 for an individual optical 5 fiber. A Gaussian beam profile is indicated by the dotted line 59. It will be seen that, contrary to the usual case for focused laser light, the focused beam profile 62 is not a perfect gaussian. The thermal dye in the print medium requires a certain minimum energy to sublime. As a result, the thermal transfer starts at a certain power level which is known as the threshold lower level for thermal dye transfer. If drum 12 is driven at a speed of, for example, 300 rpm, the threshold level will be relatively low as indicated by the line 63 and the dot size will be relatively large as indicated by dot 64. If the speed of drum 12 is increased to, for example, 600 rpm, the threshold level will increase to the level indicated by line 65, and the dot size will decrease as indicated by dot 66. These dot sizes can also be achieved by changing the laser power; however, for many applications it is preferable to control the dot size by controlling the speed of the drum 12. The provision for the adjustment of the line spacing and the dot size makes thermal printer 10 a very versatile apparatus for use in digital scanning applications. Without major system parameter changes, a continuous tone print can be produced as well as a half tone image with a wide range of pixel densities.

Figure 8:
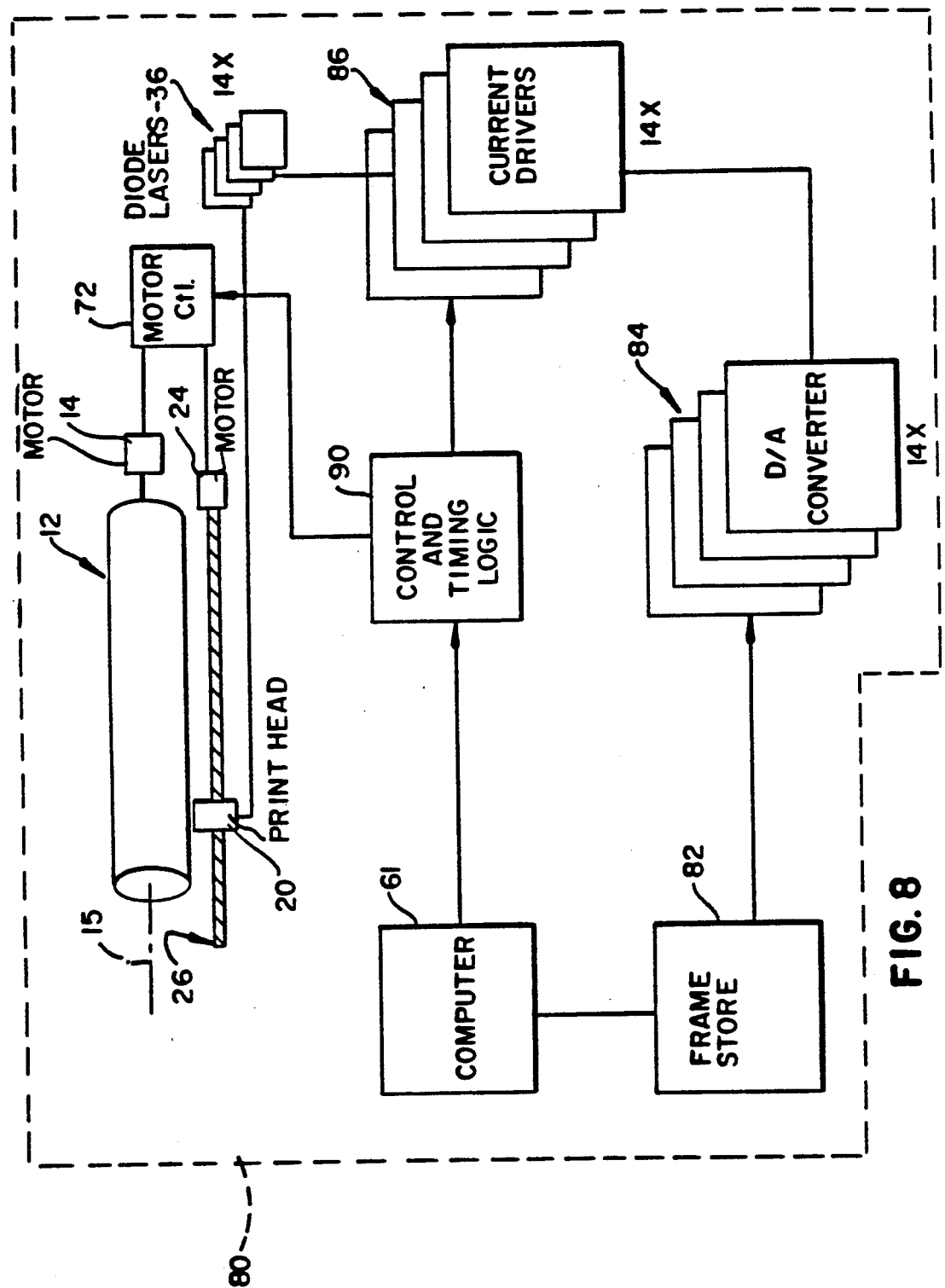
FIG. 8 is a block diagram of the electronic elements in the present invention.

A control system 80 for printer 10 is shown in FIG. 8. Control system 0 comprises a frame store 82 for storing image data received from an image scanner (not shown) or from an image storage medium (not shown). The data stored in frame store 82 includes, for example, three 8-bit values for each pixel, each value representing the red, green, or blue input for the pixel. Data from frame store 82 can be directed to image processing circuitry (not shown) in order to effect desired color corrections. The data is then delivered to digital to-analog (D/A) converters 84, and the outputs from the D/A converters drive the voltage to current drivers 86 for the diode lasers 36. Microcomputer 61 provides overall control of the printer 10. Microcomputer 61 interfaces with control and timing logic 90 which is coupled to s motor control 72 for regulating &he speeds of motor 14 for driving drum 12 and mo&or 24 for driving lead screw 26. Control and timing logic 90 also provides signals to current drivers 86 to modulate diode lasers 36 in timed relation wi&h the movement of drum 12 and print head 20.

In the use of the disclosed print head 20, the line spacing, and thus the ratio of dot overlap, can be changed by adjusting the angle θ (FIG. 5) which is the angle of the print head 20 relative to the axis of drum 12. Two significant thermal effects of the dye transfer process result when print head 20 is disposed a& an angle as shown in FIG. 5. One effect is that the amount of dye transferred is significantly increased which results in darer lines This effect of increased dye transfer is due to preheating of dye in a particular line by a diode laser in an adjacent line so that the laser energy is more efficiently used in the dye transfer process. Because of this preheating of the dye, the writing speed can be increased.

A second effect of the disclosed print head arrangement, however, is that the two outer scan lines do not receive as much thermal energy as the inner scan lines. As a result, the two outer scan lines are much narrower, by about one half of the inner scan line width, since these minipixels are much smaller. This is a source of visual density difference. Also, because of these two narrowed outer scan lines, there is a gap between adjacent swaths of scan lines, even though the print head 20 is advanced at the proper interval. This is known as the interswath defect. This difference of line width between the outer scan lines and the remainder of the scan lines creates a banding artifact. Since it takes 12 minipixels to write a half-tone dot, and the printing swath sometimes may be less than 12 minipixels wide, the interswath defect comes at a different section of each sequential half-tone dot, and thus cycles across the image. The interswath defect frequency beats with the half-tone dot frequency, and is visually observed in the image as banding. The resulting density variation has a spatial frequency in the image which, unfortunately, matches with the eye's greatest contrast sensitivity—at about 0.5 cycle/mm. At this frequency range, the typical human eye can see a variation of density of around 0.2% in green color. This small level of change is hard to control in the writing process.

Figure 7:
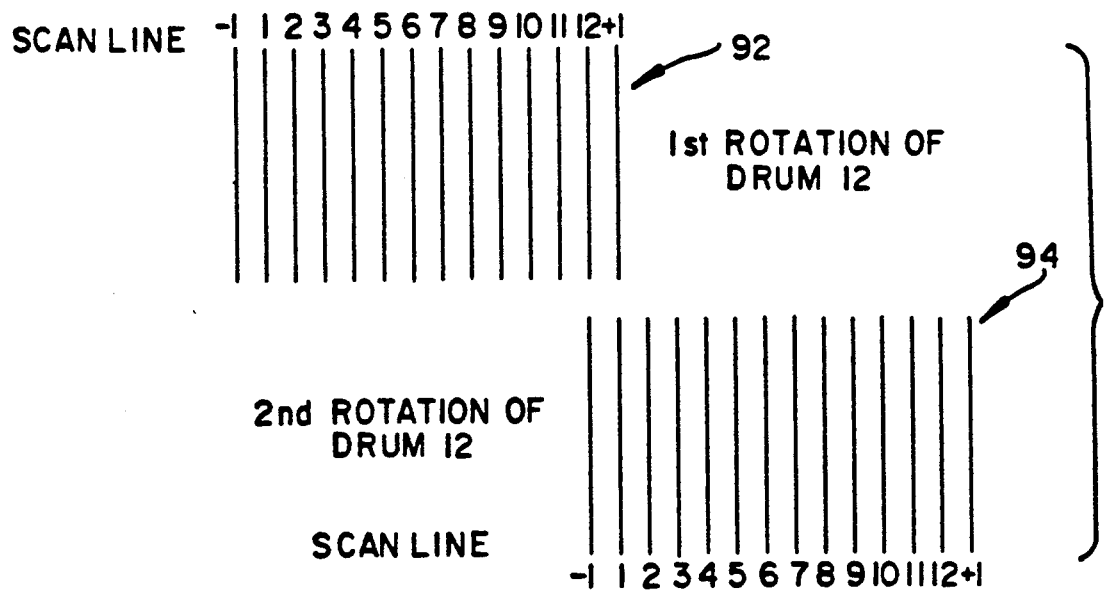
FIG. 7 is a diagram illustrating the scan lines formed by successive passes of the print head.

In order to overcome the problem of banding discussed in the preceding paragraph, two so called dummy channels are used in print head 20. The two dummy channels include the two outside optical fibers 31 in print head 20. The two dummy channels produce dummy scan lines which are not used for actual writing, but rather for preheating and postheating of inner scan lines. The scan lines for a first swath 92 and for a second swath 94 are shown in FIG. 7. The two dummy scan lines are designated (−1) and (+1), and the writing scan lines are designated (1)-(12). It will be seen that the dummy scan line (−1) of the second swath 94 overlaps the writing scan line (12) of the first swath 92, and that the writing scan line (1) of the second swath 94 overlaps the dummy scan line (+1) of the first swath 92.

There are several different ways of using the dummy scan lines (+1) and (−1) for heating in order to achieve desired image quality. It will be understood that &he dummy channels are always maintained below full power, and power to the dummy channels can be, for example, about 33% of full power. One way of using the dummy channels is for the two dummy lines (+1) and (−1) to write at a constant laser power level near the threshold point of dye transfer; in many applications, this makes the density variation between swaths not visible. A second way of using the dummy channels is for the data of the line (−1) to be exactly the same as that of the line (1) of the same swath, and the data of the line (+1) to be exactly the same as that of the line (12) of that swath. This method can alter the data intended for lines (12) and (1) by writing extra minipixels (full size). If these half-tone shapes are very important to the image quality and any distortion of the dot shape is not allowed for that reason, a third way of using the dummy channels can be employed in which the data fed to the line (−1) in a given swath is the result of a logical "AND" operation between the data of the line (12) in the preceding swath and the data of the line (1) of the given swath, minipixel by minipixel, and data fed to the (+1) line in the given swath is the result of a logical "AND" operation between the data of the line (12) of the given swath and the data of line (1) of the next swath, minipixel by minipixel. Thus, for example, with reference to FIG. 7, data for the line (−1) in second swath 94 would be the result of a logical "AND" operation between data in line (12) in first swath 92 and data in line (1) in swath 94; and data for the line (+1) in swath 94 would be the result of a logical "AND" operation between data for line (12) in swath 94 and the data in line (1) of a next swath (not shown). In utilizing the "AND" operation, if the previous line (12) was off at a given minipixel, and the corresponding line (1) minipixel is full on, then the line (−1) (preheat) will be turned off over the line (12) site, resulting in a smaller line 1 pixel. These localized minipixel size changes are less visually noticeable than the banding. It will be seen from the foregoing that, with the use of dummy channels, the formation of each half-tone do& is not distorted due to the interswath defect.

This invention has been described in detail with particular reference to &he preferred embodiment thereof, but it will be understood that variations and modifications can be effected within the spirit and scope of the invention.

We claim:

1. A thermal printer for forming an image on a thermal print medium, said printer comprising:
   means for supporting a thermal print medium for movement in a first direction;
   a source of radiation which includes a plurality of diode lasers;
   a spring head disposed adjacent said supporting means, said print head including a plurality of light sources each of which projects radiation provided by one of said diode lasers, and said print head further including optical means for focussing radiation from each of said light sources onto said medium to form a plurality of dots having a given size and spacing on the medium in a predetermined pattern;

means for driving said supporting means to move said thermal print medium in said first direction;

means for moving said print head relative to said medium in a second direction transverse to said first direction to form the image on said medium from said dots;

means for modulating each of said diode lasers in accordance with an information signal; and means for adjustably controlling the size of said dots on said medium comprising:

means for controlling said modulating means, said moving means, and said driving means in timed relation to each other to control the size of said dots formed on said medium.

2. A thermal printer, as defined in claim 1, wherein said supporting means is a rotatable drum.

3. A thermal printer, as defined in claim 2, wherein said light sources are an array of optical fibers.

4. A thermal printer, as defined in claim 3, wherein said optical fibers are supported on a planar substrate.

5. A thermal printer, as defined in claim 4, wherein said substrate is supported for selective angular adjustment in order to change the spacing of said dots formed by said printer on said medium, and said size controlling means includes means for selecting the angular adjustment.

6. A thermal printer, as defined in claim 2, wherein said means for moving said print head is a motor-driven lead screw.

7. A thermal printer for forming an image on a thermal print medium, said printer comprising:

drum means for supporting a thermal print medium for movement in a first direction;

a source of radiation which includes a plurality of diode lasers;

a print head disposed adjacent said drum means, said print head including a plurality of light sources each of which projects radiation provided by one of said diode lasers, and said print head further including optical means for focussing radiation from each of said light sources onto said medium to form a plurality of dots having a given size and spacing on the medium in a predetermined pattern;

means for driving said drum means to move said thermal print medium in said first direction;

means for moving said print head relative to said medium in a second direction transverse to said first direction in order to trace helical scan lines on said medium, said moving means including a motor driven lead screw;

means for modulating each of said diode lasers in accordance with an information signal; and means for adjustably controlling the size of said dots on said medium comprising:

means for controlling said modulating means, said moving means, and said driving means in timed relation to each other to control the size of said dots formed on said medium.

8. A thermal printer, as defined in claim 7, wherein said light sources are an array of optical fibers.

9. A thermal printer, as defined in claim 8, wherein said optical fibers are supported on a planar substrate.

10. A thermal printer, as defined in claim 9, wherein said substrate is supported for selective angular adjustment in order to change the spacing of said dots formed by said printer on said medium, and said size controlling means includes means for selecting the angular adjustment.

11. A thermal printer, as defined in claim 7, wherein said driving means is a motor-driven lead screw.

12. A thermal printer for forming an image on a thermal print medium, said printer comprising:

means for supporting a thermal print medium for movement in a first direction;

a source of radiation which includes a plurality of diode lasers;

a print head disposed adjacent said supporting means, said print head including a plurality of light sources each of which projects radiation provided by one of said diode lasers, and said print head further including optical means for focussing radiation from each of said light sources onto said medium to form a plurality of dots having a given size and spacing on the medium in a predetermined pattern;

means for driving said supporting means to move said thermal print medium in said first direction;

means for moving said print head relative to said medium in a second direction transverse to said first direction to trace a plurality of scan lines on said medium, each of said scan lines being formed from a series of said dots;

means for adjustably controlling the size of said dots on said medium;

means for modulating each of said diode lasers in accordance with an information signal; and means for controlling said modulating means, said moving means, and said driving means in timed relation to each other to control the size of said dots formed on said medium.

13. A thermal printer, as defined in claim 12, wherein said supporting means is a rotatable drum.

14. A thermal printer, as defined in claim 13, wherein said light sources are an array of optical fibers.

15. A thermal printer, as defined in claim 14, wherein said optical fibers are supported on a planar substrate.

16. A thermal printer, as defined in claim 15, wherein said means for controlling the spacing of said dots includes means for supporting said substrate for angular adjustment in order to change the spacing of said dots formed by said printer on said medium, and said size controlling means includes means for selecting the angular adjustment.

17. A thermal printer, as defined in claim 16, wherein said means for moving said print head is a motor-driven lead screw.

* * * * *